United States Patent [19]

Selwitz

[11] 3,864,410
[45] *Feb. 4, 1975

[54] PROCESS FOR HALOGENATING PARAFFINS

[75] Inventor: Charles M. Selwitz, Monroeville, Pa.

[73] Assignee: Gulf Research & Development Company, Pittsburgh, Pa.

[*] Notice: The portion of the term of this patent subsequent to Sept. 5, 1989, has been disclaimed.

[22] Filed: May 22, 1972

[21] Appl. No.: 255,645

Related U.S. Application Data

[63] Continuation-in-part of Ser. No. 22,711, March 25, 1970, Pat. No. 3,689,577.

[52] U.S. Cl..... 260/659 R, 204/163 R, 260/94.9 H, 260/96 HA, 260/93.7, 260/526, 260/645 R, 260/659 A, 260/772

[51] Int. Cl............................................. C07c 17/10
[58] Field of Search....... 260/659 R, 659 A, 96 HA, 260/94.9 H; 204/163 R

[56] References Cited
UNITED STATES PATENTS

| | | | |
|---|---|---|---|
| 2,366,518 | 1/1945 | Grebe et al. | 260/648 R X |
| 3,214,482 | 10/1965 | Coropreso et al. | 260/659 A |
| 3,689,577 | 9/1972 | Selwitz | 260/659 R X |

Primary Examiner—Leon Zitver
Assistant Examiner—Joseph A. Boska

[57] ABSTRACT

A process for chlorinating or brominating a high molecular weight paraffin which involves heating said paraffin with chloride or bromide ions, nitrate ions, sulfuric acid and water.

8 Claims, No Drawings

PROCESS FOR HALOGENATING PARAFFINS

This application is a continuation-in-part application of my Application Ser. No. 22,711, now U.S. Pat. No. 3,689,577, filed Mar. 25, 1970 entitled PROCESS FOR HALOGENATING PARAFFINS.

This invention relates to a process for chlorinating or brominating a paraffin having from 41 to about 400,000 carbon atoms.

Chlorination or bromination of high molecular weight paraffinic hydrocarbons can be effected, for example, by passing gaseous chlorine or bromine therethrough under appropriate reaction conditions. These processes are undesirable, however, for with the production of one mol of the halogenated paraffinic hydrocarbon, one mol of undesired, and generally unuseable, HCl or HBr is also produced. A technique has been developed whereby HCl is used to chlorinate very low molecular weight paraffinic materials, such as methane or ethane, but this oxychlorination involves a vapor phase reaction with oxygen and high temperatures. Such process is not feasible for higher molecular weight paraffins, however, since the halogenation is accompanied by oxidation.

I have found that chlorination or bromination of paraffins can easily be effected, without resorting to vapor phase reactions, and good conversions and high yields to desired product can be attained, by heating said high molecular weight paraffin in the presence of chloride or bromide ions, nitrate ions, sulfuric acid and water.

The paraffinic hydrocarbon that can be halogenated herein can be a straight chain, branched chain or cyclic hydrocarbon having from 41 to about 400,000 carbon atoms, but most particularly from about 400 to about 250,000 carbon atoms. Paraffinic hydrocarbons carrying substituents that do not adversely affect the course or nature of the reaction, for example, a halogen substituent or a carboxylic acid substituent, can also be used. Examples of such paraffinic materials are pentacontane, tetrahexacontane, heptacontane, Fischer-Tropsch waxes, polyethylenes having from 42 to about 400,000 carbon atoms, polypropylenes having from 42 to about 400,000 carbon atoms, polybutenes having from 44 to about 400,000 carbon atoms, polyhexenes having from 42 to about 400,000 carbon atoms, hydrogenated natural rubbers, etc.

There must be present in the reaction system chloride ions or bromide ions in sufficient quantities to halogenate the paraffinic compound defined above. By "chloride ions or bromide ions" I mean a singly negatively charged chlorine or bromine atom. Although the chloride ion or bromide ion can be obtained from many compounds, desirably such ion is obtained from a compound that is readily capable of dissociating in the present reaction system to chloride or bromide ions, such as hydrogen chloride, hydrogen bromide, ammonium chloride, ammonium bromide, organic chlorides and bromides, such as aniline hydrochloride, methyl amine hydrochloride, benzyl trimethyl ammonium bromide and metallic chlorides and bromides, such as sodium chloride, potassium bromide, rubidium chloride, magnesium bromide, cupric chloride, barium chloride, calcium chloride, aluminum bromide, etc. Of these I prefer to use hydrogen chloride or hydrogen bromide. The amount of chloride or bromide ion present in the system relative to the paraffin on a weight basis can be, for example, from about 20:1 to about 1:10, preferably from about 5:1 to about 1:2.

In order to obtain the desired conversion herein it is imperative that the above materials be brought into contact with each other in the presence of nitrate ions. Any compound which by ionization, oxidation or disproportionation under the reaction conditions defined herein will result in the production of nitrate ions can be employed. By "nitrate ions" I mean to include $NO_3^-$, a singly charged anion containing one nitrogen atom and three oxygen atoms. Examples of compounds that can be employed include nitric acid, sodium nitrate, cesium nitrate, etc. Of these I prefer to employ nitric acid. The amount of nitrate ion employed, on a weight basis, relative to the paraffin charge, can be from about 2:1 to about 1:500, preferably from about 1:1 to about 1:20.

Also required in the reaction system is sulfuric acid and water. The amount of sulfuric acid present on a weight basis, based upon the paraffin, is from about 50:1 to about 1:5, preferably from about 10:1 to about 1:1, and water present, on a weight basis, relative to the paraffin is from 50:1 to about 1:2, preferably from about 15:1 to about 5:1.

As defined above the reaction is carried out in an inert atmosphere, for example, in a nitrogen atomsphere. In a preferred embodiment, however, the reaction is carried out in the presence of molecular oxygen. When this is done, less nitrate ion is required and conversion of paraffin is increased. The amount of molecular oxygen that can be employed relative to the paraffin, on a weight basis, can be from about 100:1 to about 1:5, preferably from about 10:1 to about 1:1.

As to reaction conditions, the temperature can be from about 50° to about 150° C., preferably from about 60° to about 120° C., the pressure from about 0.5 to about 5,000 pounds per square inch gauge, preferably from about 10 to about 500 pounds per square inch gauge, and the reaction time from about 0.5 to about 50 hours.

At the end of the reaction period the alkyl halide produced, which can carry one or more halogens thereon, can be recovered from the reaction mixture in any suitable manner, for example, by separating from the aqueous phase, washing with copious amounts of water and drying at 20 mm Hg vacuum at 50° C.

The process of the invention and further be illustrated by the following examples.

EXAMPLE I

Into a 200-milliliter, thick-walled glass reactor there was placed 8.0 grams of polyhexene having a molecular weight of 6000 averaging 430 carbon atoms per molecule, 0.45 grams of palladium acetate, 49.2 grams of water, 44.6 grams of 37 per cent aqueous HCl, 59.2 grams of sulfuric acid and 4.0 grams of nitric acid. The system was heated to 100° C. and the run was conducted in the presence of visible light provided by a 150 watt bulb. Oxygen pressure of 170 pounds per square inch gauge was maintained throughout the 2.5 hour reaction period. At the end of the run the polymer was separated from the aqueous phase, washed with water and dried in a vacuum oven at 50° C. Elemental analysis showed the polymer to contain 14.1 weight per cent chlorine.

EXAMPLE II

The run of EXAMPLE I, was repeated over a reaction period of five hours and 13 minutes with 9.3 grams of polyhexene containing an average of 210,000 carbon atoms per molecule and having an average molecular weight of approximately 2,960,000. At the end of the run the aqueous phase was poured off and the polymer was washed six times with 150 milliliter quantities of water at room temperature, three times with 150 milliliter quantities of heptane at 98° C., once with methanol and then heated in boiling xylene. The xylene was removed by evaporation and the product was dried for 6 days at 80° C. at 20 millimeters of Hg vacuum. The product weighed 10.1 grams. Elemental analysis for chlorine showed the product to contain 11.9 weight per cent chlorine.

The halogenated paraffins prepared herein can be used, for example, as plasticizers or as fire-retardant paraffins.

Obviously, many modifications and variations of the invention, as hereinabove set forth, can be made without departing from the spirit and scope thereof, and therefore only such limitations should be imposed as are indicated in the appended claims.

I claim:

1. A process for preparing a halogenated paraffin selected from the group consisting of chloro paraffins and bromo paraffins which comprises heating at a temperature of about 50° to about 150° C. a paraffin having from 41 to about 400,000 carbon atoms with a halogen ion selected from the group consisting of chloride ions and bromide ions, said chloride ions and bromide ions being obtained from hydrogen chloride and hydrogen bromide, respectively, nitrate ions, sulfuric acid and water, wherein the amount of halogen ion relative to the paraffin on a weight basis is from about 20:1 to about 1:10, the amount of nitrate ion relative to the paraffin on a weight basis is from about 2:1 to about 1:500, the amount of sulfuric acid relative to the paraffin on a weight basis is from about 50:1 to about 1:5 and the amount of water relative to the paraffin on a weight basis is from about 50:1 to about 1:2.

2. The process of claim 1 wherein said paraffin charge has from about 400 to about 250,000 carbon atoms.

3. The process of claim 1 wherein said halogen ion is obtained from hydrogen chloride.

4. The process of claim 1 wherein said halogen ion is obtained from hydrogen bromide.

5. The process of claim 1 wherein said nitrate ion is obtained from nitric acid.

6. The process of claim 1 wherein said reaction is carried out in the additional presence of molecular oxygen, wherein the amount of oxygen relative to the paraffin is about 100:1 to about 1:5.

7. The process of claim 1 wherein the reaction temperature is about 60° to about 120° C.

8. The process of claim 1 wherein said paraffin is a polyhexene.

* * * * *